(12) United States Patent
Hasegawa et al.

(10) Patent No.: US 12,001,405 B2
(45) Date of Patent: Jun. 4, 2024

(54) TAPE UNMOUNTING PROTOCOL

(71) Applicant: International Business Machines Corporation, Armonk, NY (US)

(72) Inventors: Tohru Hasegawa, Tokyo (JP); Tsuyoshi Miyamura, Yokohama (JP); Atsushi Abe, Ebina (JP); Shinsuke Mitsuma, Tokyo (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 16/817,674

(22) Filed: Mar. 13, 2020

(65) Prior Publication Data

US 2021/0286772 A1  Sep. 16, 2021

(51) Int. Cl.
| | |
|---|---|
| *G06F 16/185* | (2019.01) |
| *G06F 16/11* | (2019.01) |
| *G06Q 20/14* | (2012.01) |
| *G11B 5/008* | (2006.01) |
| *G11B 5/86* | (2006.01) |

(52) U.S. Cl.
CPC .......... *G06F 16/185* (2019.01); *G06F 16/119* (2019.01); *G06Q 20/145* (2013.01); *G11B 5/00813* (2013.01); *G11B 5/86* (2013.01)

(58) Field of Classification Search
CPC ... G06F 16/185; G06F 16/119; G06Q 20/145; G11B 5/00813; G11B 5/86

USPC ........................................................ 707/823
See application file for complete search history.

(56) References Cited

U.S. PATENT DOCUMENTS

| | | | | |
|---|---|---|---|---|
| 8,527,561 | B1* | 9/2013 | Moody | G06F 3/0631 707/822 |
| 9,063,666 | B2 | 6/2015 | Amir et al. | |
| 9,235,347 | B2 | 1/2016 | Klein et al. | |
| 9,244,628 | B2 | 1/2016 | Butt et al. | |
| 9,348,837 | B2 | 5/2016 | Iwanaga et al. | |
| 10,073,632 | B2 | 9/2018 | Hasegawa et al. | |
| 10,475,477 | B1* | 11/2019 | Biskeborn | G11B 5/00813 |
| 2013/0290388 | A1* | 10/2013 | Lenox | G06F 12/0848 707/827 |
| 2016/0117259 | A1* | 4/2016 | Hasegawa | G06F 12/121 711/133 |
| 2018/0018238 | A1* | 1/2018 | Tomii | G06F 16/13 |
| 2019/0187913 | A1 | 6/2019 | Hasegawa et al. | |
| 2019/0310942 | A1* | 10/2019 | Yamamoto | G11B 5/00817 |

OTHER PUBLICATIONS

IBM, "Tape Optimized Recalls", Modified date: Jun. 18, 2018, printed Feb. 20, 2020, 3 pages.

(Continued)

*Primary Examiner* — Hosain T Alam
*Assistant Examiner* — Nicholas E Allen
(74) *Attorney, Agent, or Firm* — Stosch Sabo

(57) ABSTRACT

Described are techniques for a tape unmounting protocol. The techniques include selecting a tape for unmounting from a plurality of tape drives, where the tape for unmounting includes a remaining capacity below a first threshold and a number of migrated files below a second threshold. The techniques further include unmounting the tape for unmounting from a tape drive.

18 Claims, 6 Drawing Sheets

(56) References Cited

OTHER PUBLICATIONS

IBM, "Tapeutilization: Specifying the desired tape utilization", IBM Knowledge Center, printed Feb. 20, 2020, 3 pages.
IBM, "Sync operation", IBM Knowledge Center, printed Mar. 9, 2020, 3 pages.
Mell et al., "The NIST Definition of Cloud Computing", Recommendations of the National Institute of Standards and Technology, Sep. 2011, 7 pages.

* cited by examiner

TAPE UNMOUNTING PROTOCOL

BACKGROUND

The present disclosure relates to hierarchical storage management (HSM) systems, and, more specifically, to a tape unmounting protocol in HSM systems.

HSM systems can include relatively higher performance storage (e.g., hard disk drives, solid state drives, flash memory, etc.) as primary storage and relatively lower performance storage (e.g., a Linear Tape File System (LTFS)) as secondary storage. HSM systems can thus achieve adequate accessibility, latency, and cost characteristics by strategically combining higher performance storage and lower performance storage.

SUMMARY

Aspects of the present disclosure are directed toward a computer-implemented method comprising selecting a tape for unmounting from a plurality of tape drives, where the tape for unmounting includes a remaining capacity below a first threshold and a number of migrated files below a second threshold. The method further comprises unmounting the tape for unmounting from a tape drive.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
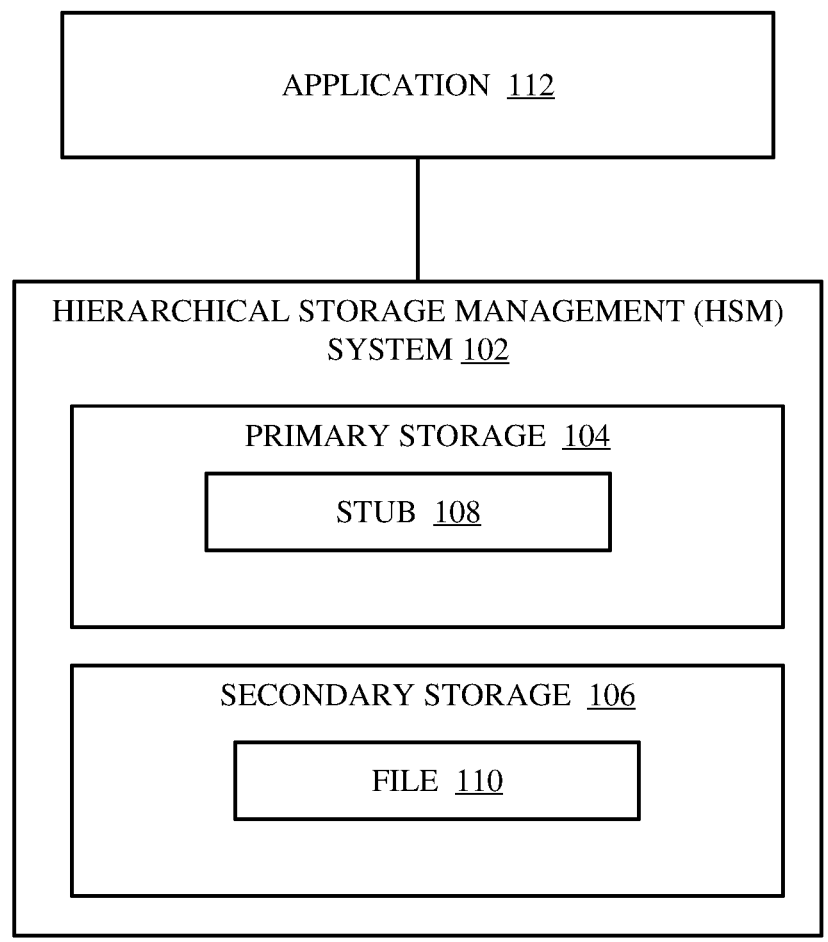
FIG. 1 illustrates a block diagram of an example storage environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward hierarchical storage management (HSM) systems, and, more specifically, to a tape unmounting protocol in HSM systems. While not limited to such applications, embodiments of the present disclosure may be better understood in light of the aforementioned context.

Mounting and/or unmounting tapes in a tape storage system can take several minutes. Thus, strategies and techniques that reduce the number of mounting and/or unmounting operations in a tape storage system result in improved performance and efficiency. Traditionally, selecting a tape for unmounting can be based on a longest time period since a respective tape was previously used (e.g., a Least Recently Used (LRU) algorithm). However, this protocol can be inadequate for accurately predicting which tapes have a lowest likelihood of being remounted.

In light of the aforementioned deficiencies in tape unmounting protocols for tape storage systems, aspects of the present disclosure are directed to techniques for reducing the number of mounting and/or unmounting operations in a tape storage system by strategically selecting a tape for unmounting when another tape needs to be mounted to a tape drive.

Specifically, aspects of the present disclosure can select a tape for unmounting that exhibits one or both of the following characteristics: (1) the tape for unmounting has relatively less remaining capacity (e.g., capacity below a threshold, or a lowest capacity relative to other mounted tapes); and/or (2) the tape for unmounting has relatively fewer files in a migrated state (e.g., a number of migrated files below a threshold, or a fewest number of migrated files relative to other mounted tapes).

Selecting tapes for unmounting according to one or both of the aforementioned characteristics decreases the likelihood that an unmounted tape will be used for migration operations in the near future (e.g., tapes with relatively less remaining capacity are less likely to be used for migration operations) or recall operations in the near future (e.g., tapes that have fewer files in a migrated state are less likely to have a recall request associated with their migrated files). Collectively, these factors select a tape for unmounting that has a lower probability of being remounted within a given time horizon, or, said another way, has a longer expected interval until being remounted relative to other mounted tapes on other tape drives. Thus, aspects of the present disclosure improve efficiency in tape storage systems by reducing the number of mount and unmount operations.

FIG. 1 illustrates an example storage environment 100, in accordance with some embodiments of the present disclosure. Storage environment 100 includes HSM system 102 comprising a primary storage 104 and a secondary storage 106. The primary storage 104 can include storage volumes having relatively higher performance and higher cost such as, for example, hard disk drives (HDDs), solid state drives (SSDs), flash memory, and the like. Secondary storage 106 can include storage volumes having relatively lower performance and lower cost such as, for example, a tape storage system such as a linear tape file system (LTFS).

In some embodiments, files are transferred between primary storage 104 and secondary storage 106 according to usage characteristics or other parameters. For example, a file that is frequently accessed by an application 112 can be stored on primary storage 104, whereas a file that is infrequently accessed by an application 112 can be stored on secondary storage 106. In some embodiments, a file, such as file 110, is stored on secondary storage 106 and includes a stub 108 on primary storage 104, where the stub 108 functions as an indicator of the existence of the file 110 on the secondary storage 106. For example, when an application 112 initiates an access request to the stub 108, the file 110 is read out from the secondary storage 106 and moved to the primary storage 104 in order to respond to the access request.

In some situations, when an application 112 initiates an access request to the stub 108, the file 110 is determined to be stored on a corresponding tape that is not mounted on any tape drive of the secondary storage 106. Thus, the corresponding tape must be mounted to a tape drive. However, in many situations, all tape drives already have a tape mounted thereon. Accordingly, aspects of the present disclosure can select a tape for unmounting from one of the tape drives in order to mount the corresponding tape to the tape drive for copying the file 110 from the secondary storage 106 to the primary storage 104. In accordance with embodiments of the present disclosure, the selected tape for unmounting can exhibit one or both of the following characteristics: (1) the selected tape for unmounting has relatively less remaining capacity (e.g., capacity below a threshold, or a lowest capacity relative to other mounted tapes); and/or (2) the selected tape for unmounting has relatively fewer files in a migrated state (e.g., a number of migrated files below a threshold, or a fewest number of migrated files relative to other mounted tapes). The aforementioned characteristics can improve performance of the HSM system 102 by reducing the number of mount/unmount operations in the secondary storage 106.

Numerous types of HSM systems 102 exist such as, but not limited to, Spectrum Archive Enterprise Edition® (a product of International Business Machines Corporation). Furthermore, although a primary storage 104 and a secondary storage 106 are shown, any number of storage tiers are possible in alternative embodiments, such as, for example, a three-tier storage system with a primary tier (e.g., flash memory), a secondary tier (e.g., HDDs), and a tertiary tier (e.g., tape). Thus, aspects of the present disclosure are applicable to any HSM system 102 having two or more tiers where at least one of the tiers includes a tape storage system.

Figure 2:
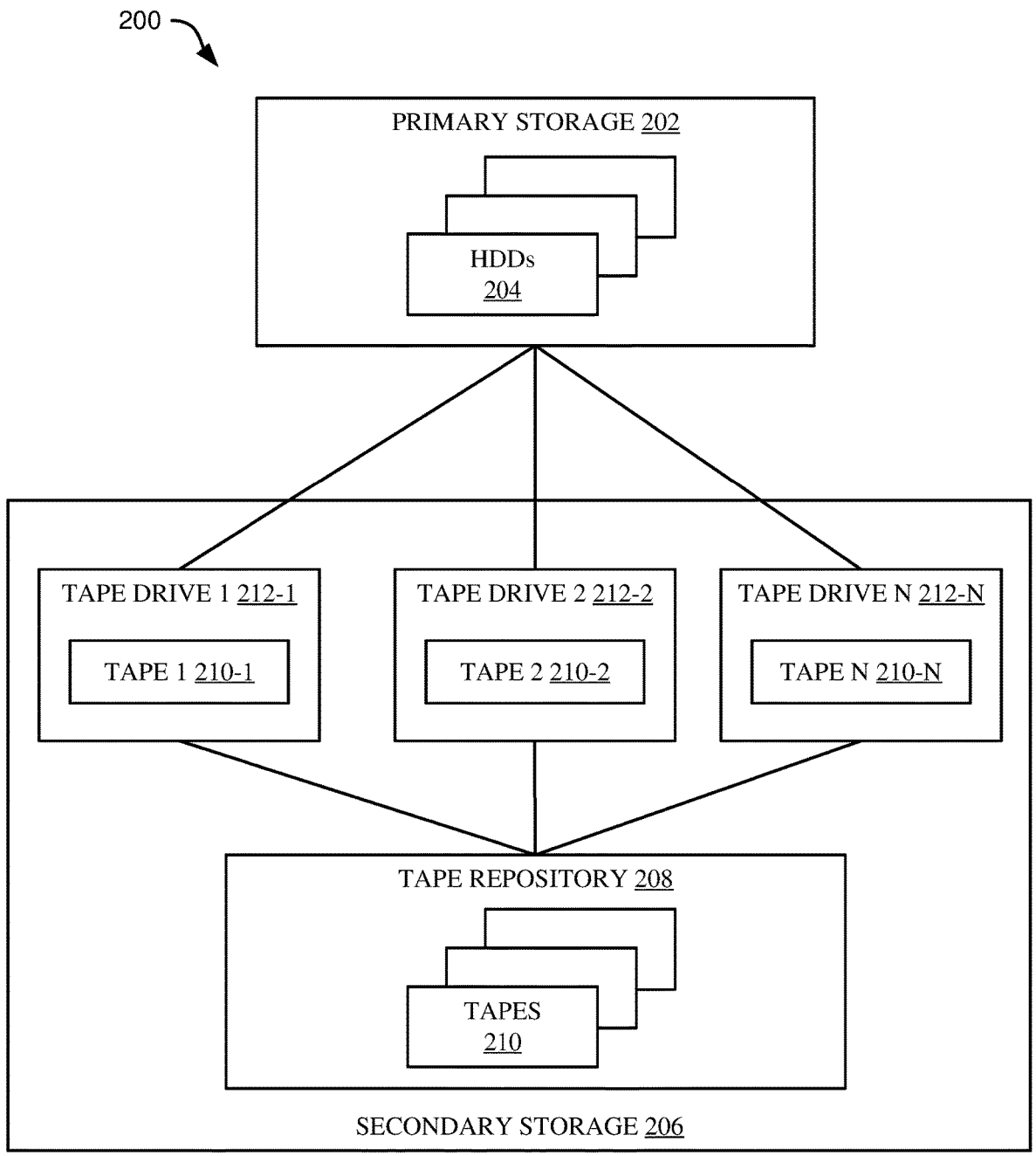
FIG. 2 illustrates a block diagram of an example hierarchical storage management (HSM) environment including a primary storage and a secondary storage, in accordance with some embodiments of the present disclosure.

FIG. 2 illustrates a block diagram of an example HSM system 200, in accordance with some embodiments of the present disclosure. In some embodiments, the HSM system 200 is a more detailed view of the HSM system 102 described in FIG. 1. The HSM system 200 can include primary storage 202 having a plurality of HDDs 204. The HSM system 200 further includes secondary storage 206. Secondary storage 206 can include tape repository 208 having a plurality of tapes 210. The secondary storage 206 can further include a plurality of tape drives 212 (individually referred to as tape drive 1 212-1, tape drive 2 212-2, and tape drive N 212-N, where N can be any variable integer). The tape drives 212 can access tapes 210 from the tape repository 208. In some embodiments, the tape drives 212 can function as an intermediary between the tapes 210 in tape repository 208 and the HDDs 204 in primary storage 202.

Respective tape drives 212 can have a respective tape 210 mounted thereon. For example, tape 1 210-1 is mounted on tape drive 1 212-1. Likewise, tape 2 210-2 is mounted on tape drive 2 212-2 and tape N 210-N is mounted on tape drive N 212-N. The tapes 210 mounted on tape drives 212 can be used for data migration (e.g., transferring data from the primary storage 202 to the secondary storage 206), data recall (e.g., transferring data from the secondary storage 206 to the primary storage 202), or other operations. During data migration operations and data recall operations, various files in the tapes 210 can have a variety of states such as, for example, (1) Resident State: where the file is present on the primary storage 202 and not on the secondary storage 206; (2) Premigrated State: where the file is present on the primary storage 202 and a copy of the file is created on the secondary storage 206; and (3) Migrated State: where the file is copied to the secondary storage 206 and a stub file (e.g., stub 108 of FIG. 1) corresponding to the copied file is stored on the primary storage 202.

The HSM system 200 can manage operations in the HSM system 200 based on the aforementioned states and/or other information. In some embodiments, the HSM system 200 can manage which tapes 210 are loaded on which tape drives 212 and, when necessary, select tapes 210 for unmounting from the tape drives 212 in order to make room to mount another tape 210.

For example, when performing a recall operation (e.g., moving a file from the secondary storage 206 to the primary storage 202), if the tape 210 storing the relevant file is not already mounted on a tape drive 212, then it needs to be mounted on a tape drive 212. If any of the tape drives 212 have no tapes 210 mounted thereon, then the tape 210 storing the relevant file can be mounted on one of the free tape drives 212 having no mounted tape 210. However, this is rarely the case as most tape storage systems maintain fully loaded tape drives 212 under the assumption that a recently used tape 210 is likely to be used again in the near future (and thus it would be inefficient to unmount any tape 210 from a tape drive 212 and then remount the same tape 210 to the same or different tape drive 212 shortly thereafter). Thus, oftentimes all tape drives 212 have mounted tapes 210 in a tape storage system. In these instances, a tape 210 of one of the tape drives 212 needs to be unmounted, and the tape 210 storing the relevant file needs to be mounted on the newly unmounted tape drive 212.

This can, for example, be achieved using a LRU algorithm, where a tape 210 is selected to be unmounted in response to determining that it is associated with a longest time period since a previous use. However, this can result in an unnecessary amount of tape mountings/unmountings given other characteristics of the tapes 210 beyond a time since a previous use. In contrast to the LRU algorithm, aspects of the present disclosure can select a tape for unmounting that exhibits one or both of the following characteristics: (1) the tape for unmounting has relatively less remaining capacity (e.g., capacity below a threshold, or a lowest capacity relative to other mounted tapes); and/or (2) the tape for unmounting has relatively fewer files in a migrated state (e.g., a number of migrated files below a threshold, or a fewest number of migrated files relative to other mounted tapes).

Selecting tapes according to one or both of the aforementioned characteristics makes it possible to unmount a tape that is less likely to be used for future migration operations (e.g., due to the tape for unmounting having relatively less remaining capacity) and, further, the tape for unmounting is less likely to be used for future recall operations (e.g., tapes that have fewer files in a migrated state are less likely to have a recall request associated with their migrated files). Collectively, these factors can decrease the frequency of tape mounting and unmounting operations.

Figure 3:
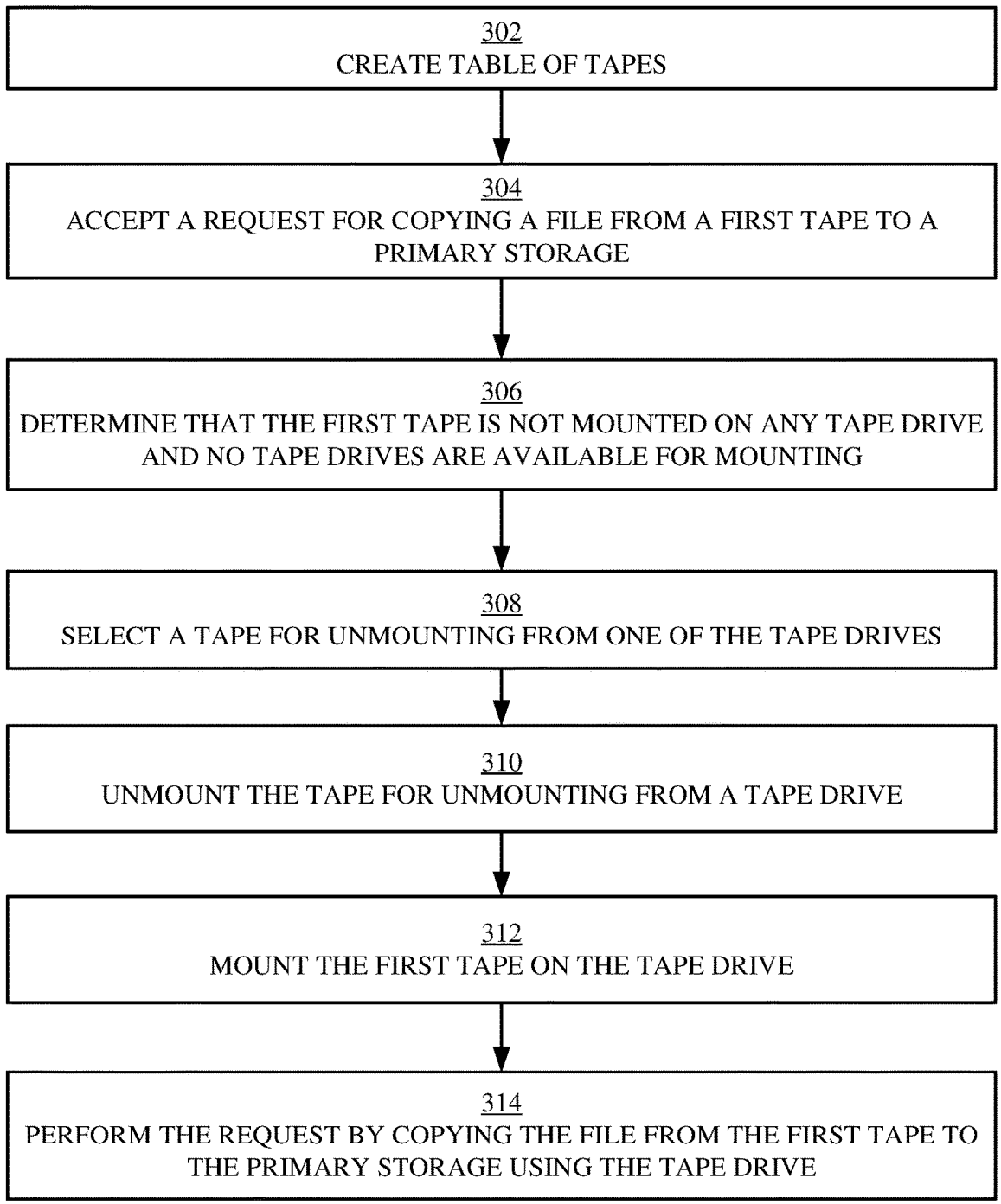
FIG. 3 illustrates a flowchart of an example method for efficiently selecting a tape for unmounting from a tape drive, in accordance with some embodiments of the present disclosure.

FIG. 3 illustrates a flowchart of an example method 300 for efficiently selecting a tape for unmounting from a tape drive, in accordance with some embodiments of the present disclosure. In some embodiments, the method 300 can be implemented by a HSM system (e.g., HSM system 114 of FIG. 1 or HSM system 200 of FIG. 2), a computer (e.g., computer 400 of FIG. 4), a cloud computing node (e.g., cloud computing node 10 of FIG. 5), a processor, or another configuration of hardware and/or software.

Operation 302 includes creating a table of tapes indicating, for respective tapes, respective numbers of migrated files, respective numbers of premigrated files, and respective remaining capacities. An example of the table of tapes is shown below in Table 1:

TABLE 1

| TapeID | # Migrated Files | # Premigrated Files | Remaining Capacity |
|---|---|---|---|
| TAPE_1 | 100 | 50 | 20 GB |
| TAPE_2 | 30 | 10 | 30 GB |
| TAPE_3 | 0 | 0 | 1500 GB |

As shown in Table 1, TAPE_1 includes 100 migrated files, 50 premigrated files, and 20 GB of remaining storage capacity. Likewise, TAPE_2 includes 30 migrated files, 10 premigrated files, and 30 GB of remaining storage capacity. Likewise, TAPE_3 includes no migrated files, no premigrated files, and 1500 GB of remaining storage capacity.

In some embodiments, Table 1 is stored in some portion of an HSM system (such as HSM system 102 of FIG. 1 or HSM system 200 of FIG. 2). Table 1 can be updated during operation of the HSM system. For example, when a file transitions from a resident state to a premigrated state due to a migration operation, the #Premigrated Files value of the corresponding tape can be incremented by one in Table 1. As another example, when a file transitions from a premigrated state to a migrated state due to a migration operation, the #of Premigrated Files value of the corresponding tape can be decremented by one and the #Migrated Files value of the corresponding tape can be incremented by one. As another example, when a file transitions from a migrated state to a premigrated state due to a recall operation, the #Premigrated Files value of the corresponding tape can be incremented by one and the #Migrated Files value of the corresponding tape can be decremented by one. As another example, when a file transitions from a premigrated state to a resident state due to a recall operation, the #Premigrated Files value of the corresponding tape can be decremented by one.

In addition to the operations discussed above, update operations and deletion operations on the files (and/or stubs) can also be monitored. For example, when a file in a migrated state or a premigrated state is updated or deleted, the tape in which the file has been saved with a migrated state or premigrated state is identified and the corresponding value (e.g., #Migrated Files or #Premigrated Files) is decremented by one.

In some embodiments, for a file in a migrated state or a premigrated state, the HSM system records, as metadata, information indicative of the tape to which the file has been saved. Thus, the HSM system is able to identify the tape to which the file has been saved by reference to the metadata when updating the stub.

Finally, although migrated files and premigrated files are shown separately in Table 1, in some embodiments, they are combined and referred to simply as migrated files (where the phrase encompasses files in a migrated state and files in a premigrated state). Thus, when the term migrated files is used herein, it can refer to files in a migrated state, or files in both a migrated state and a premigrated state, according to various embodiments of the present disclosure.

Operation 304 includes accepting a request for copying a file from a first tape to a primary storage. In some embodiments, the request is a recall request. In other embodiments, the request is any request that requires a tape to be mounted on a tape drive.

Operation 306 includes determining that the first tape is not mounted on a tape drive and no tape drives are available for mounting. For example, if the first tape were mounted on a tape drive, the method 300 would proceed with operation 314 and perform the recall operation. Likewise, if a tape drive were available (e.g., no other tape was mounted on a given tape drive), then the method 300 would proceed to operation 312 and mount the first tape on the free tape drive and then perform the recall operation.

Operation 308 includes selecting a tape for unmounting from a tape drive. In some embodiments, operation 308 includes accessing the table of tapes generated in operation 302 to collect sufficient information for selecting a tape for unmounting from a tape drive. In some embodiments, the selected tape for unmounting is based on (1) an amount of free space remaining on the tape for unmounting, (2) a number of migrated files stored on the tape for unmounting, and/or (3) a number of premigrated files stored on the tape for unmounted. More specifically, in some embodiments, the tape for unmounting is selected as a tape with an amount of free space below a first threshold level, and/or a number of migrated files below a second threshold level, and/or a number of premigrated files below a third threshold level. If two or more tapes satisfy the selection criteria, then operation 308 can select the tape having the smallest amount of free space relative to the two or more tapes, or the fewest number of migrated files relative to the two or more tapes, or the fewest number of premigrated files relative to the two or more tapes.

Although thresholds are discussed above, other embodiments utilize scores based on the amount of remaining space, the number of migrate files, and/or the number of premigrated files of each of the tapes mounted on a tape drive. When utilizing scores, different factors can be associated with different weights. For example, the amount of remaining space can be associated with a 30% weighting and the number of migrated files can be associated with a 70% weighting. In embodiments utilizing scores, the tape for unmounting can be the tape associated with a lowest or a highest score relative to other mounted tapes.

Operation 310 includes unmounting the tape for unmounting from the tape drive. Operation 312 includes mounting the first tape on the tape drive. Operations 310 and 312 can be implemented by, for example, a robotic tape mounting and unmounting subsystem associated with the tape storage system.

Operation 314 includes performing the request by copying the file from the first tape to the primary storage using the tape drive. Advantageously, various aspects of the method 300 can improve efficiency of a tape storage system by selecting a tape for unmounting that has a lower likelihood of requiring remounting shortly thereafter. In other words, aspects of the present disclosure identify a tape for unmounting that is less likely to be remounted for migration purposes (e.g., due to the relatively smaller amount of free space) or recall purposes (e.g., due to the relatively fewer number of migrated files).

Figure 4:
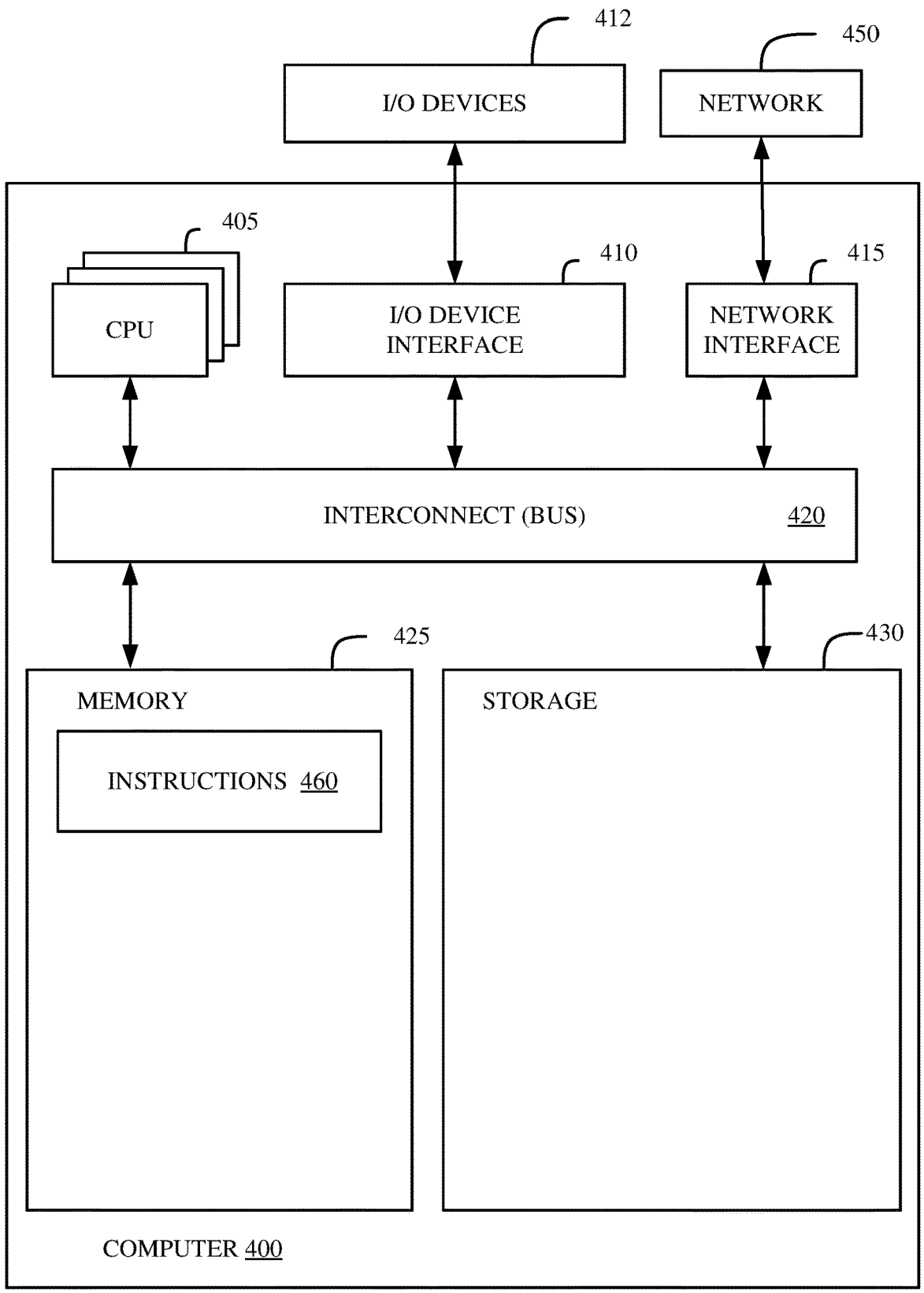
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform any or all of the method described in FIG. 3 and/or implement the functionality discussed in any one of FIGS.

1 and/or 2. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) the HSM system 114 of FIG. 1, the HSM system 200 of FIG. 2, or another aspect of the present disclosure.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, the method of FIG. 3 and/or implement the functionality discussed in FIGS. 1 and/or 2. In some embodiments, instructions 460 can be referred to as a tape unmounting protocol, a tape unmounting mechanism, or tape unmounting instructions. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
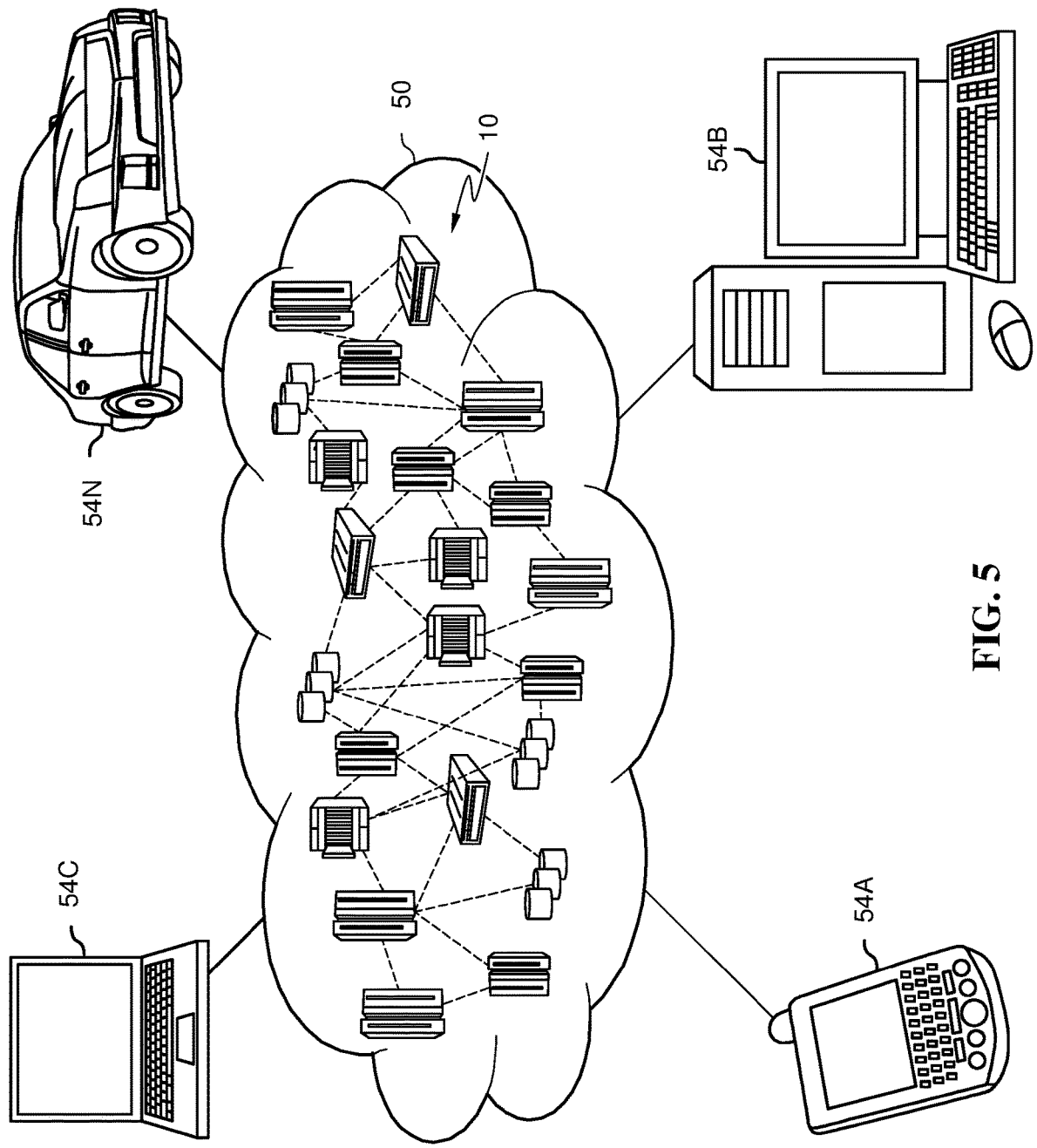
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
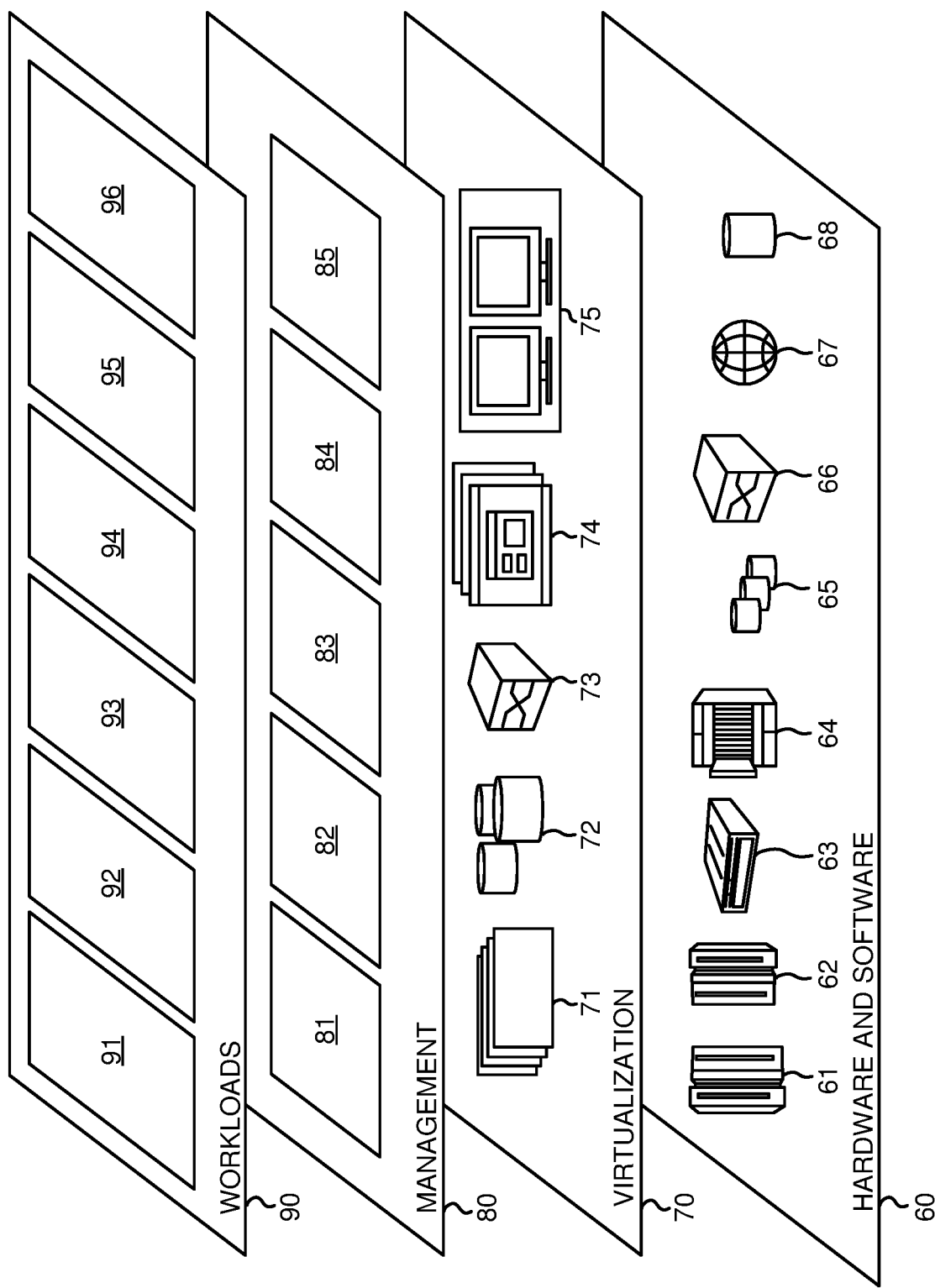
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tape unmounting protocols 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any portion of the method described with respect to FIG. 3 and/or implement any portion of the functionality discussed in FIGS. 1 and/or 2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
accepting a request for copying a file from an unmounted first tape to a primary storage, wherein the accepting comprises:
    determining that the first tape is not mounted on any tape drive; and
    determining that each of a plurality of tape drives includes a mounted tape;
selecting a second tape for unmounting from the plurality of mounted tape drives, wherein the second tape includes a remaining capacity below a first threshold and a number of migrated files below a second threshold;
unmounting the second tape from a tape drive;
mounting the first tape on the tape drive; and
performing the request by copying the file from the first tape to the primary storage using the tape drive.

2. The method of claim 1, further comprising:
storing a table including, for respective tapes, respective numbers of migrated files, respective numbers of pre-migrated files, and respective available capacities; and
wherein selecting the second tape for unmounting includes accessing the table to retrieve the remaining capacity and the number of migrated files for the second tape for unmounting.

3. The method of claim 1, wherein the second tape for unmounting including the remaining capacity below the first threshold further includes a least amount of remaining capacity relative to other tapes that are mounted on the plurality of tape drives.

4. The method of claim 1, wherein the second tape for unmounting including the number of migrated files below the second threshold further includes a least number of migrated files relative to other tapes that are mounted on the plurality of tape drives.

5. The method of claim 1, wherein the request is a recall request.

6. The method of claim 1, wherein the method is executed by a hierarchical storage management (HSM) system including the primary storage and a secondary storage comprising a tape storage system.

7. The method of claim 6, wherein the method is performed according to software that is downloaded to the HSM system from a remote data processing system, and wherein the method further comprises:
metering a usage of the software; and
generating an invoice based on metering the usage.

8. A system comprising:
one or more processors; and
one or more computer-readable storage media storing program instructions which, when executed by the one or more processors, are configured to cause the one or more processors to perform a method comprising:
accepting a request for copying a file from an unmounted first tape to a primary storage, wherein the accepting comprises:
    determining that the first tape is not mounted on any tape drive; and
    determining that each of a plurality of tape drives includes a mounted tape;
selecting a second tape for unmounting from the plurality of mounted tape drives, wherein the second tape for unmounting includes a remaining capacity below a first threshold and a number of migrated files below a second threshold;
unmounting the second tape for unmounting from a tape drive;
mounting the first tape on the tape drive; and
performing the request by copying the file from the first tape to the primary storage using the tape drive.

9. The system of claim 8, wherein the one or more computer-readable storage media store additional program instructions configured to cause the one or more processors to perform the method further comprising:
storing a table including, for respective tapes, respective numbers of migrated files, respective numbers of pre-migrated files, and respective available capacities; and
wherein selecting the second tape for unmounting includes accessing the table to retrieve the remaining capacity and the number of migrated files for the second tape for unmounting.

10. The system of claim 8, wherein the second tape for unmounting including the number of migrated files below the second threshold further includes a least number of migrated files relative to other tapes that are mounted on the plurality of tape drives.

11. The system of claim 8, wherein the request is a recall request.

12. The system of claim 8, wherein the one or more processors and the one or more computer-readable storage media are associated with a hierarchical storage management (HSM) system including the primary storage and a secondary storage comprising a tape storage system.

13. A computer-implemented method comprising:
determining that a second tape is not mounted on any tape drive;
determining that there are no available tape drives of a plurality of tape drives;
selecting a tape for unmounting from a tape drive, wherein the tape includes a remaining capacity below a first threshold and a number of migrated files below a second threshold;
unmounting the tape from the tape drive;
mounting the second tape on the tape drive in response to unmounting the tape from the tape drive; and
copying a file from the second tape to a primary storage using the tape drive.

14. The method of claim 13, wherein the method further comprises:
storing a table including, for respective tapes, respective numbers of migrated files, respective numbers of pre-migrated files, and respective available capacities; and
wherein selecting the tape for unmounting includes accessing the table to retrieve the remaining capacity and the number of migrated files for the tape for unmounting.

15. The method of claim 13, wherein the tape for unmounting including the remaining capacity below the first threshold further includes a least amount of remaining capacity relative to other tapes that are mounted on the plurality of tape drives.

16. The method of claim 13, wherein the tape for unmounting including the number of migrated files below the second threshold further includes a least number of migrated files relative to other tapes on the plurality of tape drives.

17. The method of claim 13, wherein the copying the file is performed in response to a recall request.

18. The method of claim 13, wherein the method is executed by a hierarchical storage management (HSM) system including the primary storage and a secondary storage comprising a tape storage system.

* * * * *